US012131862B2

(12) United States Patent
Inui et al.

(10) Patent No.: US 12,131,862 B2
(45) Date of Patent: Oct. 29, 2024

(54) ELECTRONIC COMPONENT

(71) Applicant: TDK CORPORATION, Tokyo (JP)

(72) Inventors: Kyosuke Inui, Tokyo (JP); Makoto Morita, Tokyo (JP); Takashi Kudo, Tokyo (JP); Toshiyuki Anbo, Tokyo (JP); Kyohei Tonoyama, Tokyo (JP); Fuyuki Miura, Tokyo (JP); Masanori Sugai, Tokyo (JP); Eietsu Abe, Tokyo (JP); Toru Tonogai, Tokyo (JP); Yuichi Oyanagi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 651 days.

(21) Appl. No.: 17/320,402

(22) Filed: May 14, 2021

(65) Prior Publication Data

US 2021/0358683 A1 Nov. 18, 2021

(30) Foreign Application Priority Data

May 14, 2020 (JP) ................................ 2020-085092
Sep. 7, 2020 (JP) ................................ 2020-149924

(51) Int. Cl.
*H01F 27/29* (2006.01)
*H01F 27/28* (2006.01)
*H01F 41/06* (2016.01)

(52) U.S. Cl.
CPC ......... *H01F 27/29* (2013.01); *H01F 27/2823* (2013.01); *H01F 41/06* (2013.01)

(58) Field of Classification Search
CPC ...... H01F 27/29; H01F 27/2823; H01F 41/06; H01F 17/04; H01F 27/292; H01F 2017/048
See application file for complete search history.

(56) References Cited

U.S. PATENT DOCUMENTS 6,144,280 A * 11/2000 Amada ................ H01F 27/292 336/205
2013/0255071 A1 10/2013 Muneuchi et al.
2014/0338185 A1 11/2014 Muneuchi et al.
(Continued)

FOREIGN PATENT DOCUMENTS

CN 105321685 A 2/2016
JP H06-267784 A 9/1994
(Continued)

OTHER PUBLICATIONS

Dec. 7, 2023 Office Action issued in U.S. Appl. No. 17/320,380.
(Continued)

*Primary Examiner* — Malcolm Barnes
(74) *Attorney, Agent, or Firm* — Oliff PLC

(57) ABSTRACT

An electronic component according to the present invention includes: a leadout electrode portion provided on an outer surface of an element main body; and a resin electrode layer formed at a part of the outer surface of the element main body and connected to the leadout electrode portion. The leadout electrode portion contains copper as a main component, and the resin electrode layer includes a conductor powder containing silver, and a resin. Further, a diffusion layer containing copper oxide and silver is formed at an interface between the leadout electrode portion and the resin electrode layer.

5 Claims, 16 Drawing Sheets

(56) References Cited

U.S. PATENT DOCUMENTS

| | | | | |
|---|---|---|---|---|
| 2016/0035476 | A1* | 2/2016 | Mimura | H01F 41/046 336/199 |
| 2016/0314890 | A1 | 10/2016 | Kitajima et al. | |
| 2017/0301458 | A1 | 10/2017 | Mimura et al. | |
| 2018/0182539 | A1 | 6/2018 | Muneuchi et al. | |
| 2019/0122809 | A1 | 4/2019 | Mimura et al. | |
| 2020/0365314 | A1 | 11/2020 | Mimura et al. | |
| 2021/0043366 | A1 | 2/2021 | Ooi et al. | |
| 2021/0098186 | A1* | 4/2021 | Wakabayashi | H01F 27/24 |
| 2021/0202152 | A1* | 7/2021 | Wakabayashi | H01F 17/04 |
| 2021/0202154 | A1* | 7/2021 | Wakabayashi | H01F 27/32 |
| 2021/0272740 | A1* | 9/2021 | Wakabayashi | H01F 27/2804 |
| 2022/0208463 | A1* | 6/2022 | Hoshino | H01F 27/29 |

FOREIGN PATENT DOCUMENTS

| | | | |
|---|---|---|---|
| JP | H11-345745 | A | 12/1999 |
| JP | 2013-045926 | A | 3/2013 |
| JP | 2014-225590 | A | 12/2014 |
| JP | 2017-191941 | A | 10/2017 |
| JP | 2018-006501 | A | 1/2018 |
| JP | 2018-107198 | A | 7/2018 |
| WO | 94/10697 | A1 | 5/1994 |
| WO | 2015/115180 | A1 | 8/2015 |

OTHER PUBLICATIONS

U.S. Appl. No. 17/320,380, filed May 14, 2021 in the name of Inui et al.

Jun. 21, 2024 U.S. Office Action issued in U.S. Appl. No. 17/320,380.

* cited by examiner

ELECTRONIC COMPONENT

TECHNICAL FIELD

The present invention relates to an electronic component having a terminal electrode.

BACKGROUND

As shown in Patent Document 1, an electronic component having a terminal electrode (may be referred to as "external electrode") formed on an outer surface of an element body is known. In this electronic component, the terminal electrode is connected to an internal electrode or a leadout electrode such as a lead provided in the element body.

For example, as shown in Patent Document 1, this terminal electrode can be formed by applying firing type paste containing a metal powder and a glass component to the outer surface of the element body, and by subjecting this paste-applied part to a baking treatment at a temperature of approximately 700° C. or at a temperature equal to or higher than the temperature. However, in the case of forming the terminal electrode by performing the baking treatment at a high temperature as described above, a defect such as cracks may occur in the element body due to an influence of a thermal stress.

In addition, Patent Document 2 discloses a method of forming a terminal electrode by using thermosetting paste containing a metal powder and a thermosetting resin. In this case, when forming the terminal electrode, a heating treatment may be performed at a hardening temperature of the resin, and the baking treatment at the high temperature is not necessary. However, in the terminal electrode disclosed in Patent Document 2, problems arise in that joining strength to the leadout electrode cannot be sufficiently secured and contact resistance of a joining portion becomes high.

[Patent Document 1] JP 2013-045926 A

[Patent Document 2] JP H6-267784 A

SUMMARY

The present invention has been made in view of above circumstances, and an object thereof is to provide an electronic component in which joining reliability of a terminal electrode is high and a terminal electrode has low resistance.

To accomplish the above object, the electronic component according to the present invention includes:

a leadout electrode portion provided on an outer surface of an element main body; and a resin electrode layer formed at a part of the outer surface of the element main body and connected to the leadout electrode portion, wherein the leadout electrode portion contains copper as a main component, the resin electrode layer includes a conductor powder containing silver, and a resin, and a diffusion layer containing copper oxide and silver is formed at an interface between the leadout electrode portion and the resin electrode layer.

In the electronic component according to the present invention, by having the above configuration, joining reliability between the leadout electrode portion and the terminal electrode (resin electrode layer) can be sufficiently secured. In addition, a reduction in resistance of the terminal electrode can be realized.

The thickness of the diffusion layer may be at least 30 nm or greater. In addition, the diffusion layer can be recognized as a region in which a concentration gradient of silver occurs from an outermost surface of the leadout electrode portion toward the resin electrode layer.

Preferably, the conductor powder of the resin electrode layer includes first particles having a particle size of a micrometer order, and second particles having a particle size of a nanometer order. Since the resin electrode layer has the above configuration, joining reliability of the terminal electrode is further improved, and a resistance of the terminal electrode can be further reduced.

Preferably, the first particles have a flat shape, and the second particles aggregate among the first particles.

Due to the above configuration, the second particles electrically connect among the first particles, and the resistance of the terminal electrode can be further reduced.

The diffusion layer may intermittently exist along the interface between the leadout electrode portion and the resin electrode layer.

Further, an oxidized film mainly containing copper oxide may be formed on a surface side of the leadout electrode portion. In this case, the diffusion layer is located between the oxidized film and the resin electrode layer. In the electronic component according to the present invention, even when the oxidized film exists on the surface side of the leadout electrode portion, the diffusion layer is formed between the leadout electrode portion and the resin electrode. Accordingly, the joining strength of the terminal electrode can be sufficiently secured, and the resistance of the terminal electrode can be reduced.

Figure 4A:
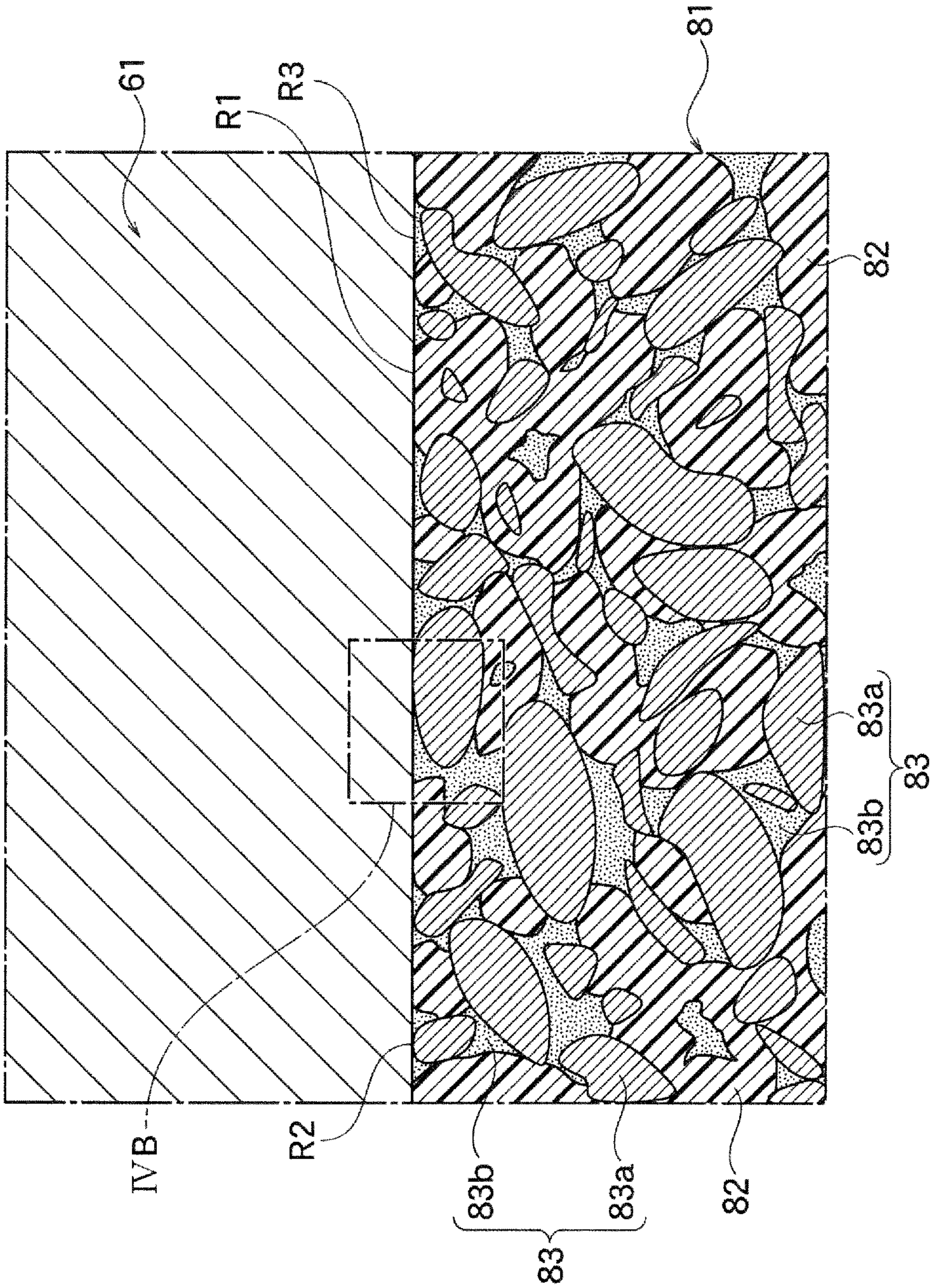
FIG. 4A is a cross-sectional view illustrating a joining portion between a leadout electrode portion and a terminal electrode.
Figure 4B:
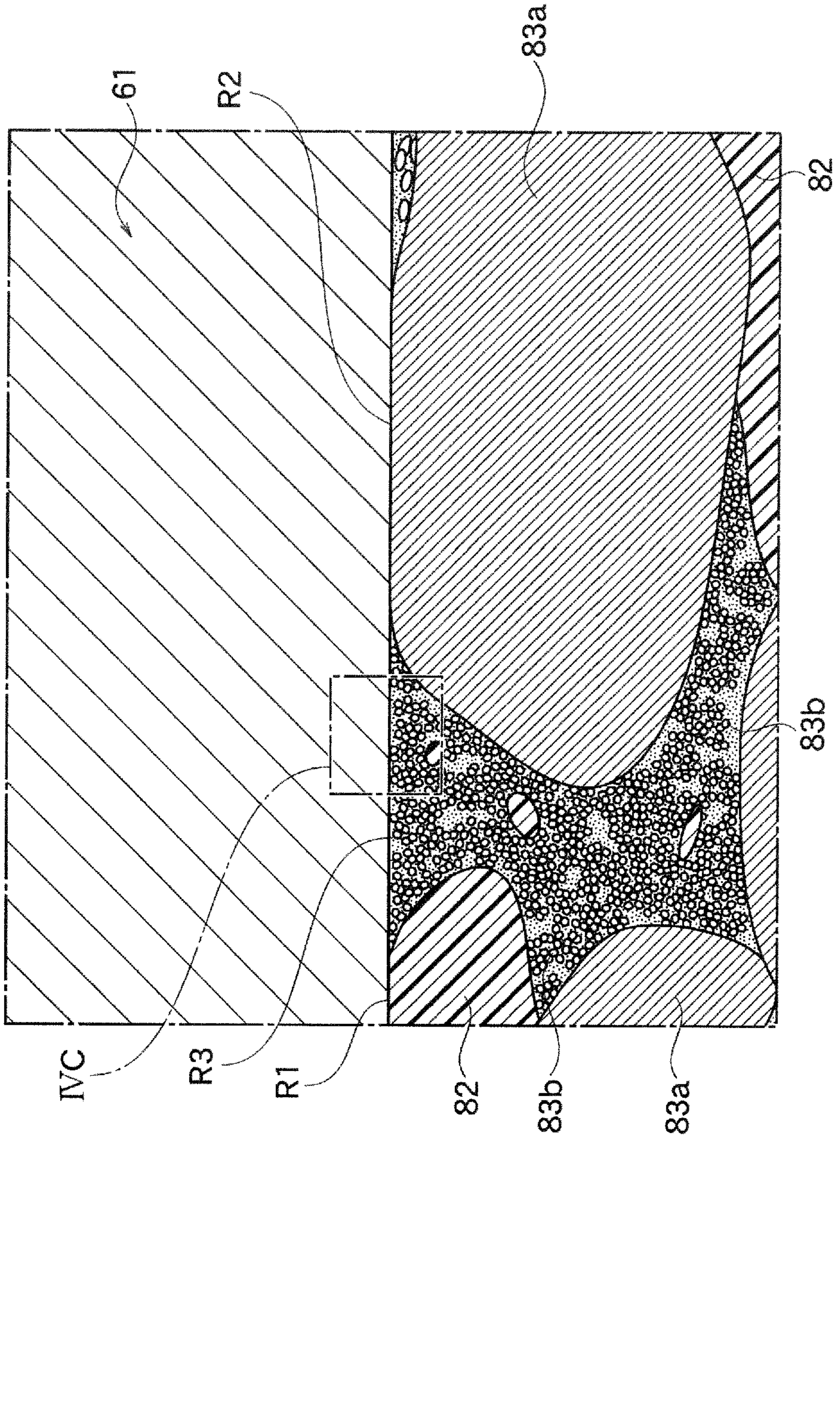
Figure 4C:
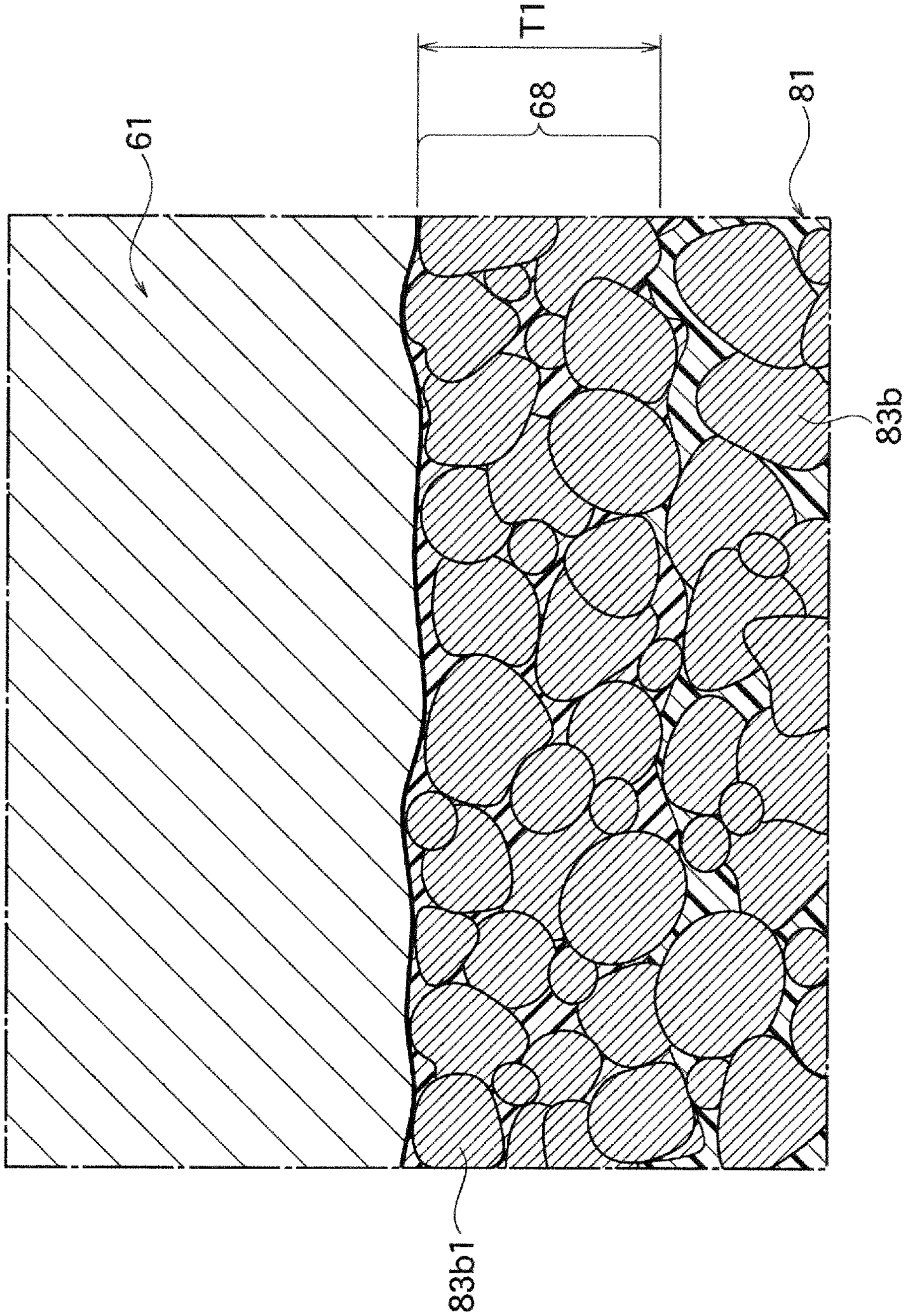
Figure 4D:
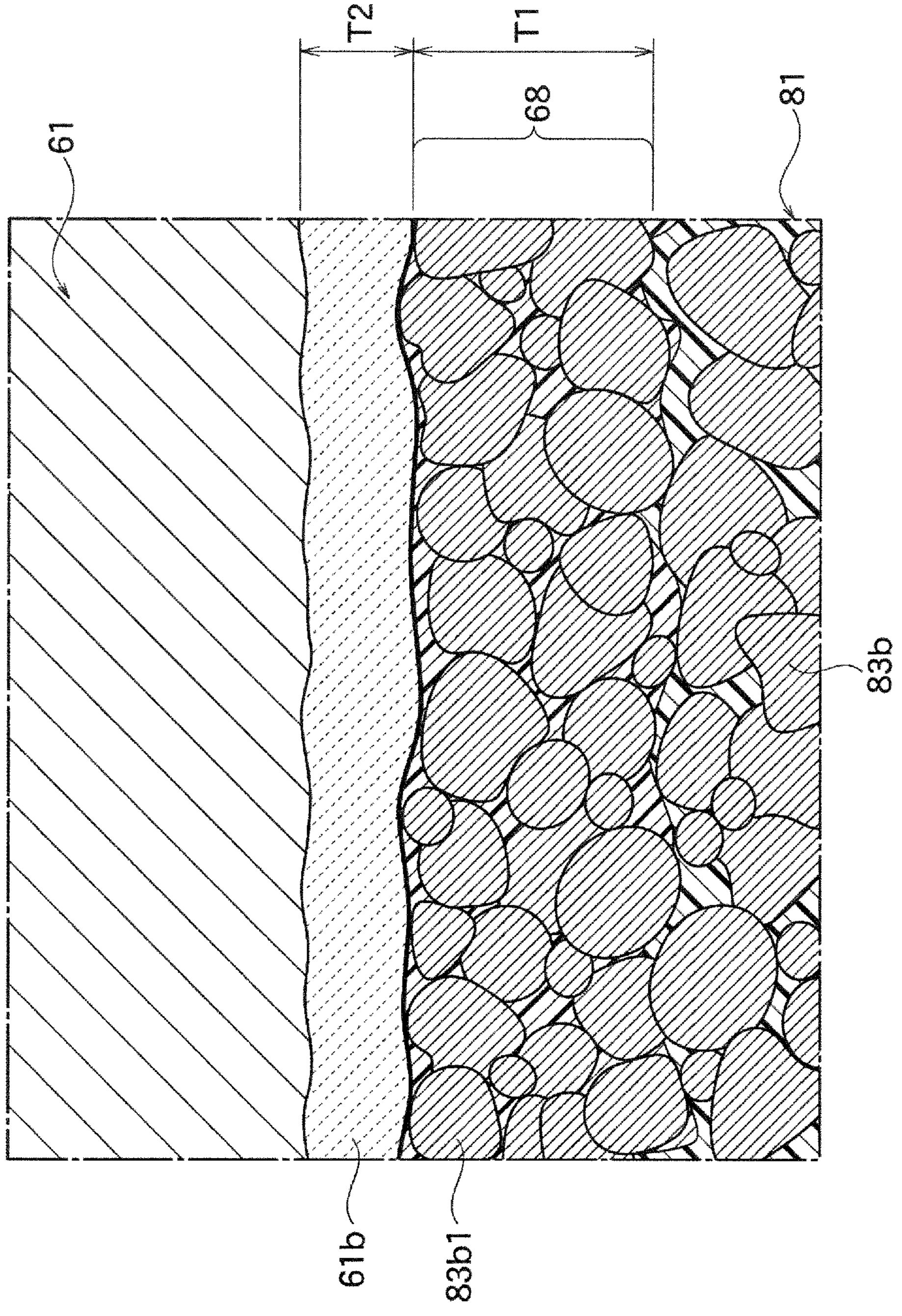
Figure 5A:
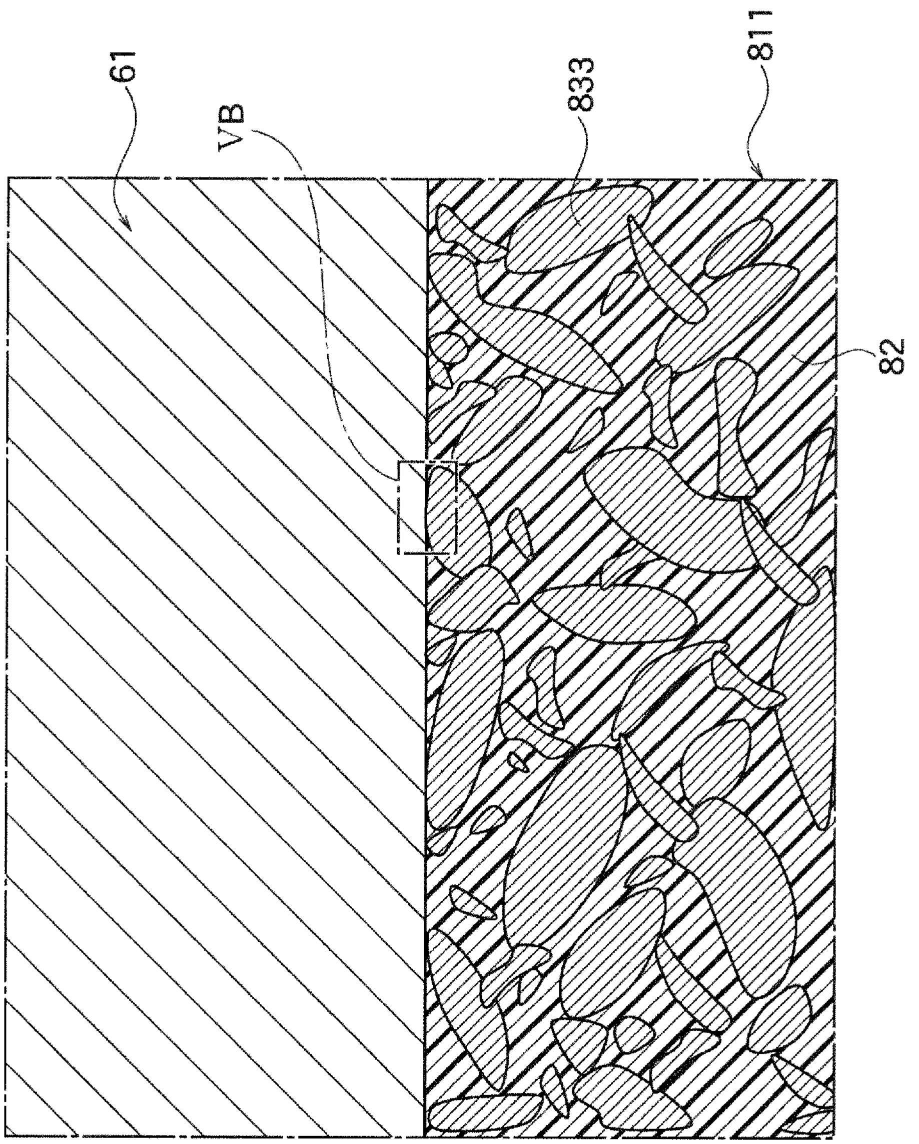
Figure 5B:
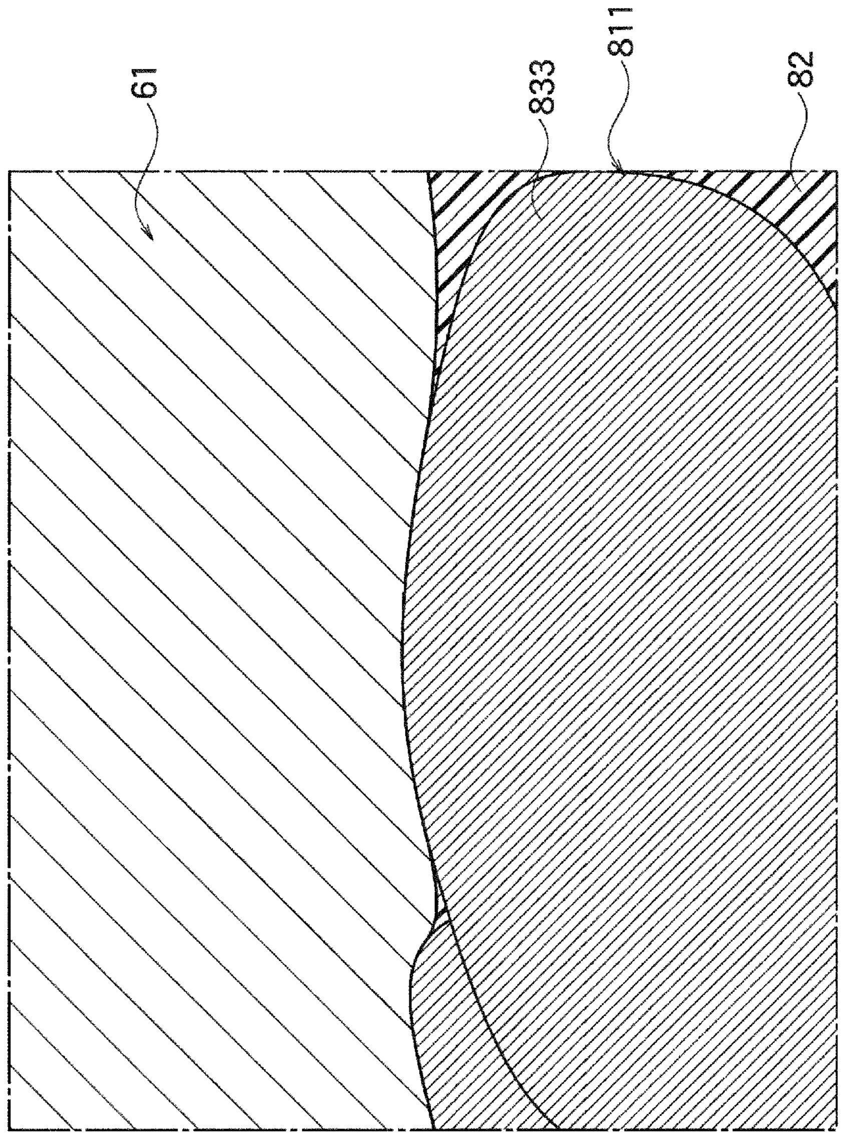
Figure 6A:
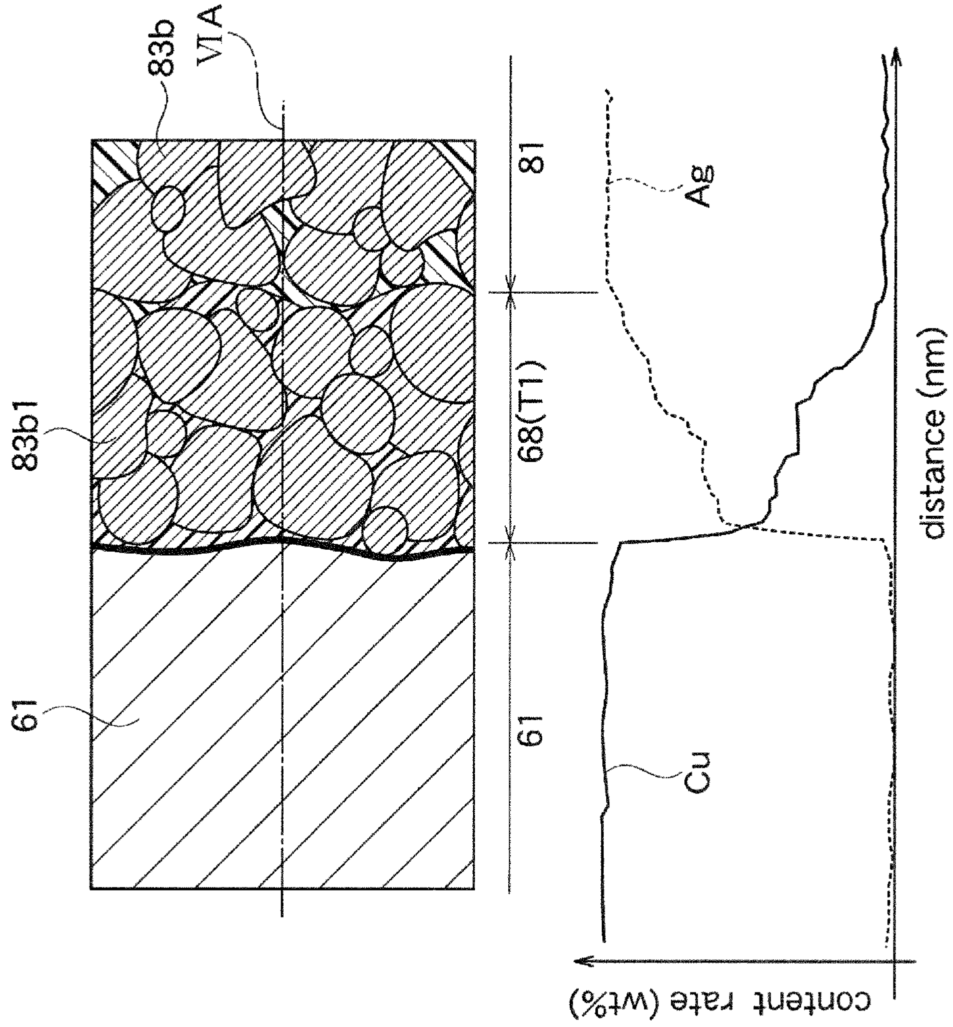
Figure 6B:
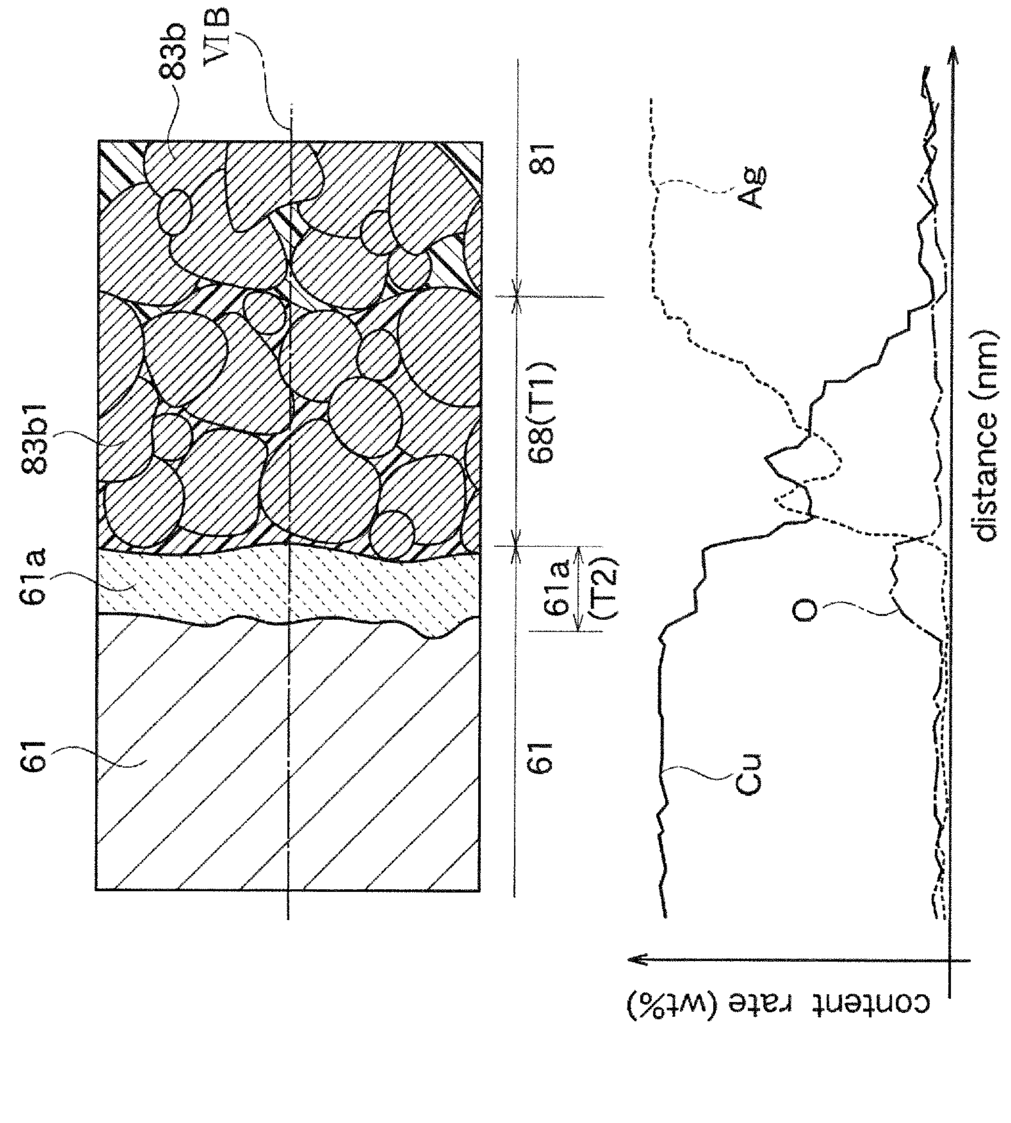
Figure 7:
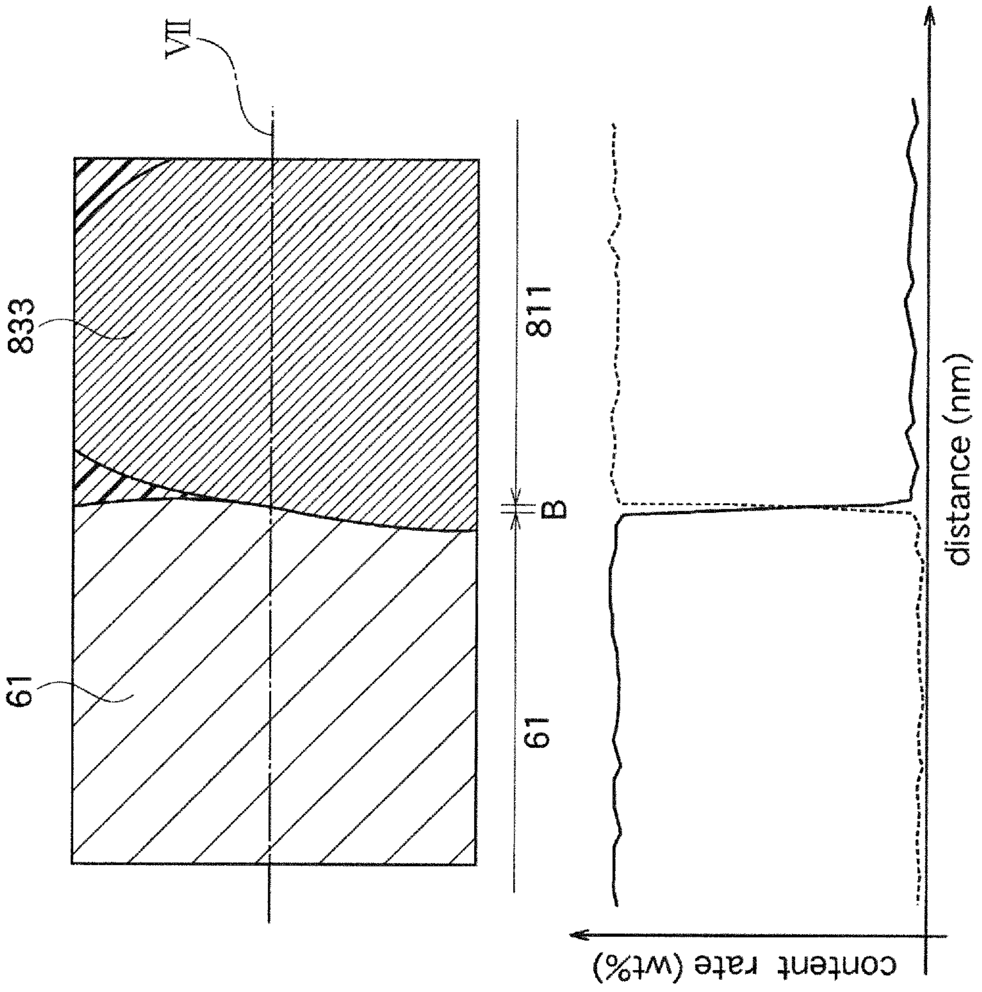
Figure 8A:
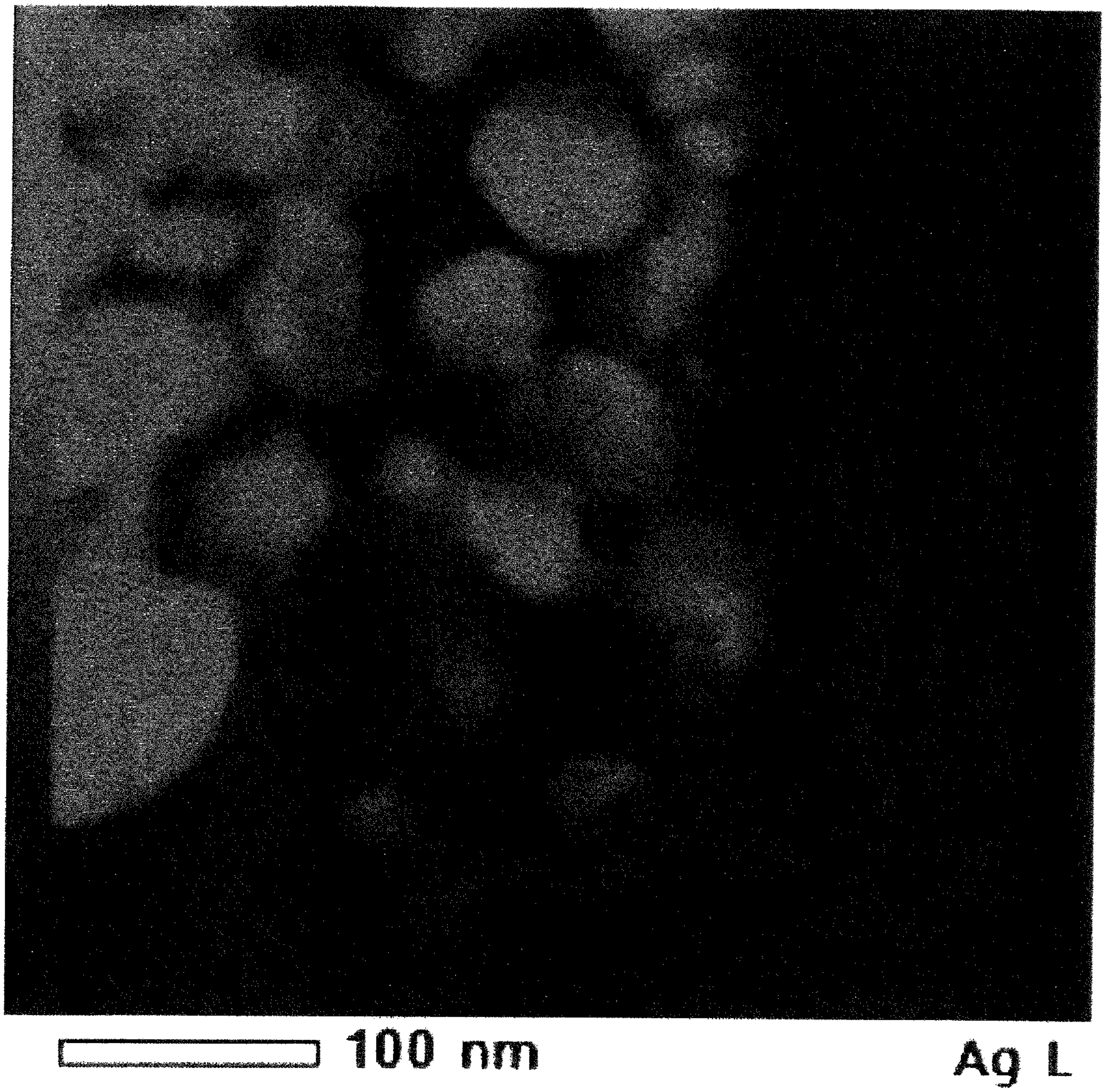
Figure 8B:
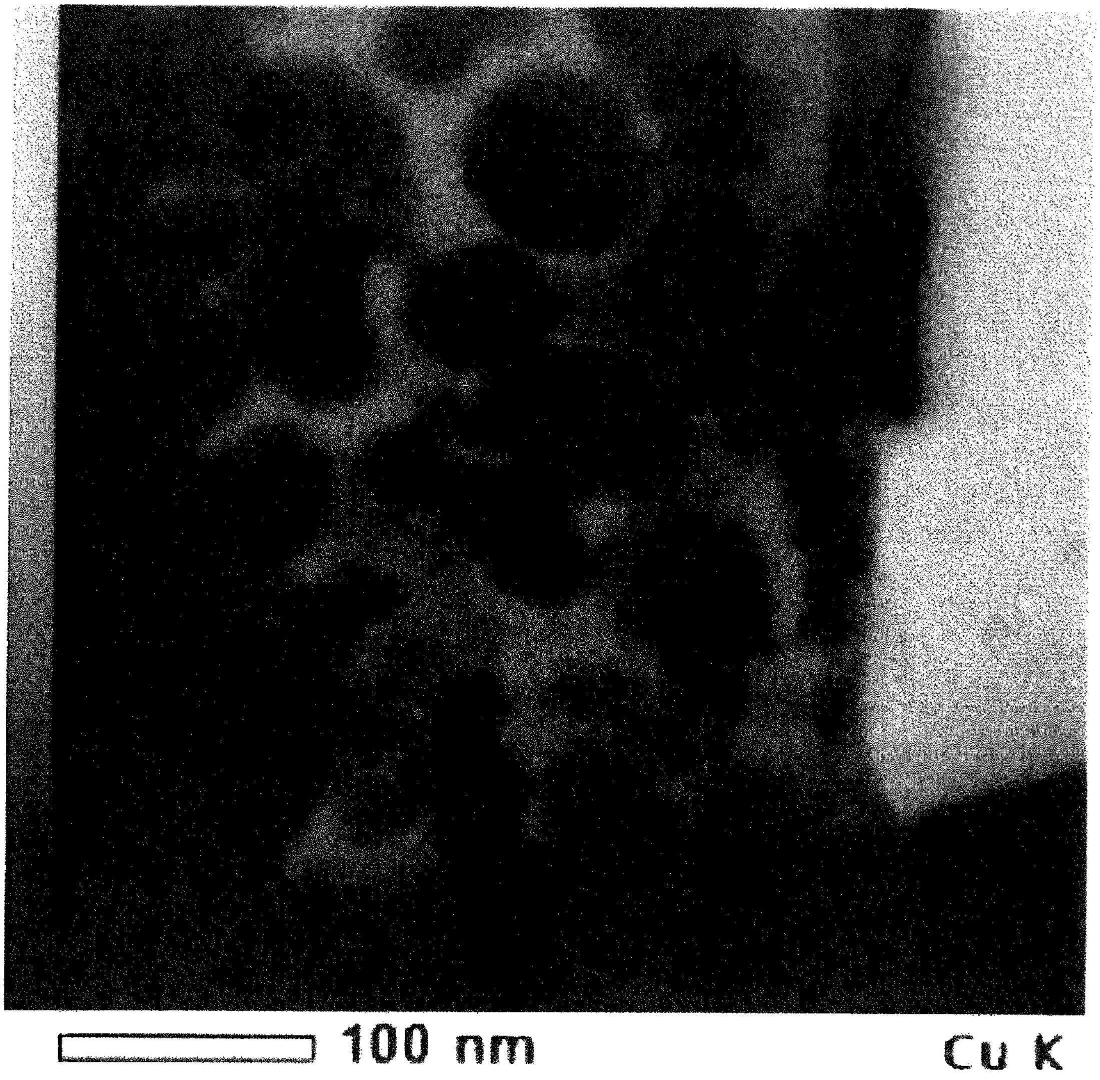

FIG .4B is an enlarged cross-sectional view of a region IVB shown in FIG. 4A;

FIG. 4C is an enlarged cross-sectional view of a region IVC shown in FIG. 4B;

FIG. 4D is a cross-sectional view illustrating a modification example of FIG. 4C;

FIG. 5A is a cross-sectional view illustrating a joining portion between the leadout electrode portion and the terminal electrode in an electronic component of the related art;

FIG. 5B is an enlarged cross-sectional view of a region VB shown in FIG. 5A;

FIG. 6A is a line analysis result of an interface between the leadout electrode portion and the terminal electrode shown in FIG. 4C;

FIG. 6B is a line analysis result of an interface between the leadout electrode portion and the terminal electrode shown in FIG. 4D;

FIG. 7 is a line analysis result of a boundary surface between the leadout electrode portion and the terminal electrode shown in FIG. 5B;

FIG. 8A is a mapping image of Ag in a cross-section as shown in FIG. 4C;

FIG. 8B is a mapping image of Cu in a cross-section as shown in FIG. 4C; and

Figure 8C:
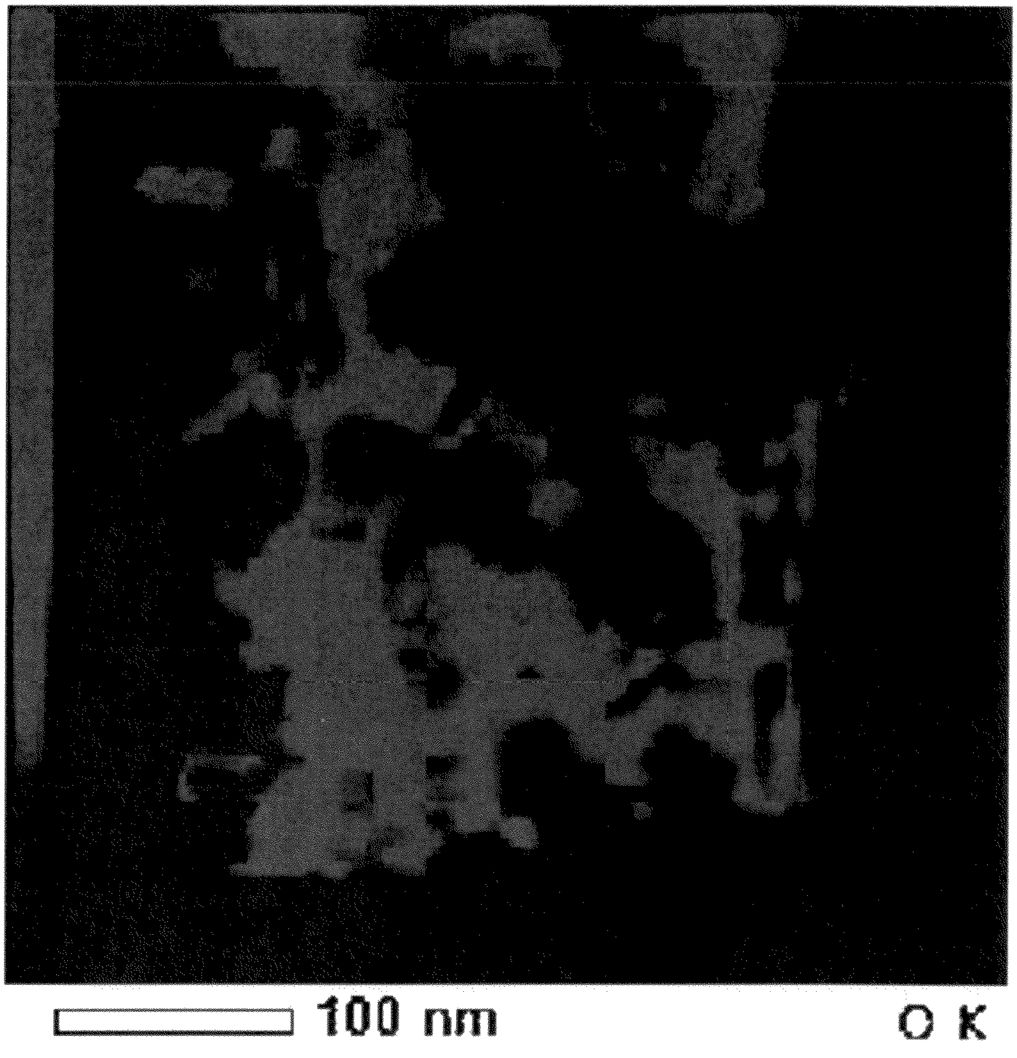

FIG. 8C is a mapping image of O in a cross-section as shown in FIG. 4C.

DETAILED DESCRIPTION OF THE EMBODIMENTS

Hereinafter, the present invention is described in detail based on an embodiment shown in the drawings.

Figure 1:
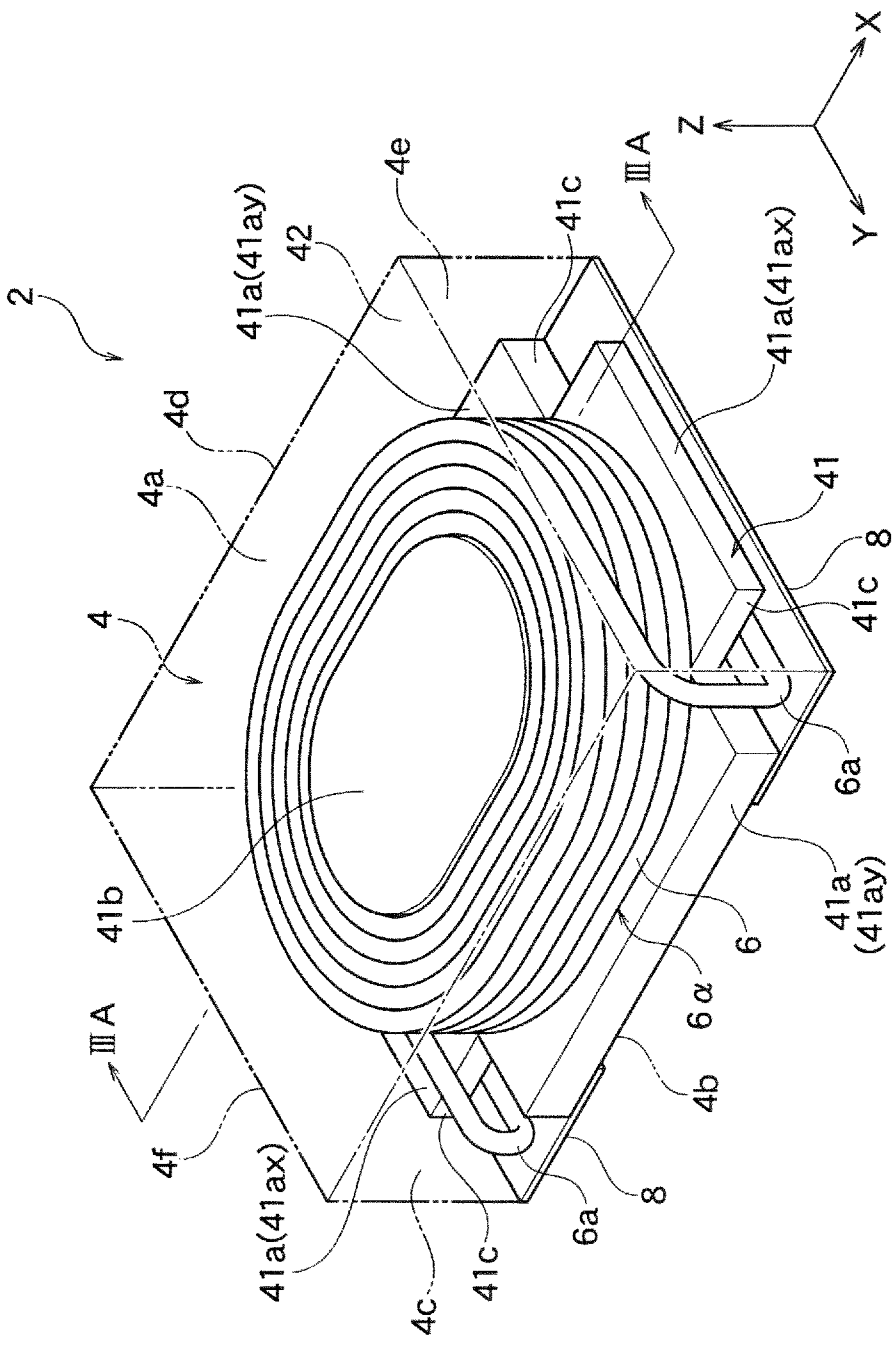
FIG. 1 is a perspective view of an electronic component according to an embodiment of the present invention.

As shown in FIG. 1, an inductor 2 as an electronic component according to this embodiment of the present invention includes an element main body 4 having an approximately rectangular parallelepiped shape (approximately hexahedron).

The element main body 4 includes an upper surface 4*a*, a bottom surface 4*b* locate on an opposite side of the upper surface 4*a* in a Z-axis direction, and four side surfaces 4*c* to 4*f*. Dimensions of the element main body 4 are not particularly limited. For example, a dimension of the element main body 4 in an X-axis direction can be set to 1.2 to 6.5 mm, a dimension of that in a Y-axis direction can be set to 0.6 to 6.5 mm, and a dimension of that in a height (Z-axis) direction can be set to 0.5 to 5.0 mm.

Figure 2:
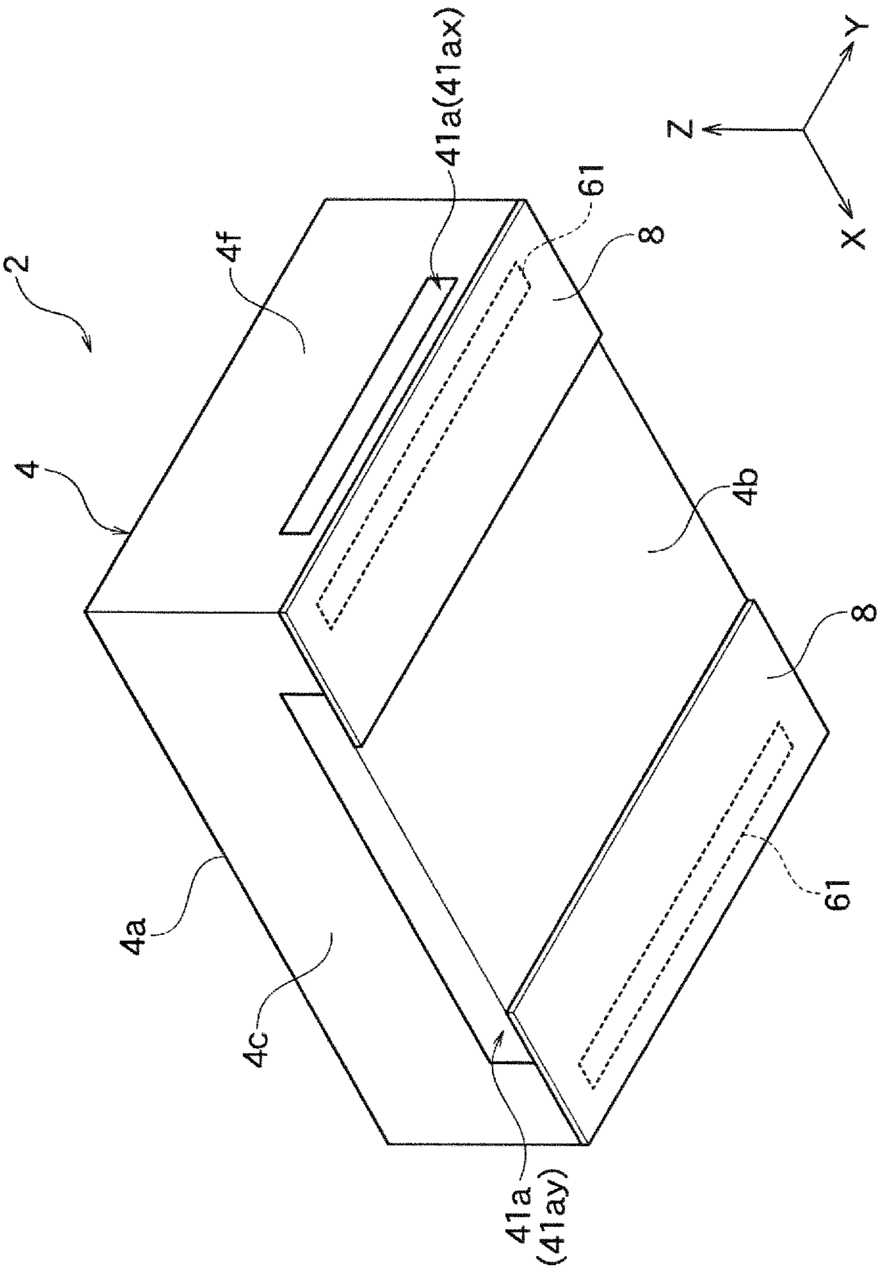
FIG. 2 is a perspective view of the electronic component shown in FIG. 1 viewed from a mounting surface side.

As shown in FIG. 1 and FIG. 2, a pair of terminal electrodes 8 is formed on the bottom surface 4*b* of the element main body 4. The pair of terminal electrodes 8 is formed to be spaced (separated) from each other in the X-axis direction, and are insulated from each other. In the inductor 2 of this embodiment, an external circuit can be connected to the terminal electrodes 8 through an interconnection (not illustrated) or the like. Alternatively, the inductor 2 can be mounted on various substrates such a circuit substrate by using a joining member such as solder or conductive adhesive. In the case of being mounted on the substrate, the bottom surface 4*b* of the element main body 4 becomes a mounting surface, and the terminal electrodes 8 are joined to the substrate by the joining member.

In addition, the element main body 4 includes a coil portion 6α at the inside thereof. The coil portion 6α is constituted by winding a wire 6 as a conductor in a coil shape. In FIG. 1 of this embodiment, the coil portion 6α is wound with a typical normal-wise manner, but a winding method of the wire 6 is not limited thereto. For example, the winding method of the wire 6 may be α-winding or edgewise winding. Alternatively, the wire 6 may be directly wound around a winding core portion 41*b* (refer to FIG. 3A) to be described later.

The wire 6 constituting the coil portion 6α includes a conductor portion mainly containing copper, and an insulating layer covering an outer periphery of the conductor portion. More specifically, the conductor portion is constituted by pure copper such as oxygen-free copper and tough pitch copper, a copper-containing alloy such as phosphor bronze, brass, red brass, beryllium copper, and silver-copper alloy, or a copper-coated steel wire. On the other hand, the insulating layer is not particularly limited as long as the insulating layer has an electrical insulating property. Examples thereof include an epoxy resin, an acrylic resin, polyurethane, polyimide, polyamide-imide, polyester, nylon, and the like, or a synthetic resin obtained by mixing at least two or more kinds of the above resins. In addition, as shown in FIG. 1 and FIG. 3A, the wire 6 of this embodiment is a round wire, and a cross-sectional shape of the conductor portion has a circular shape.

Figure 3A:
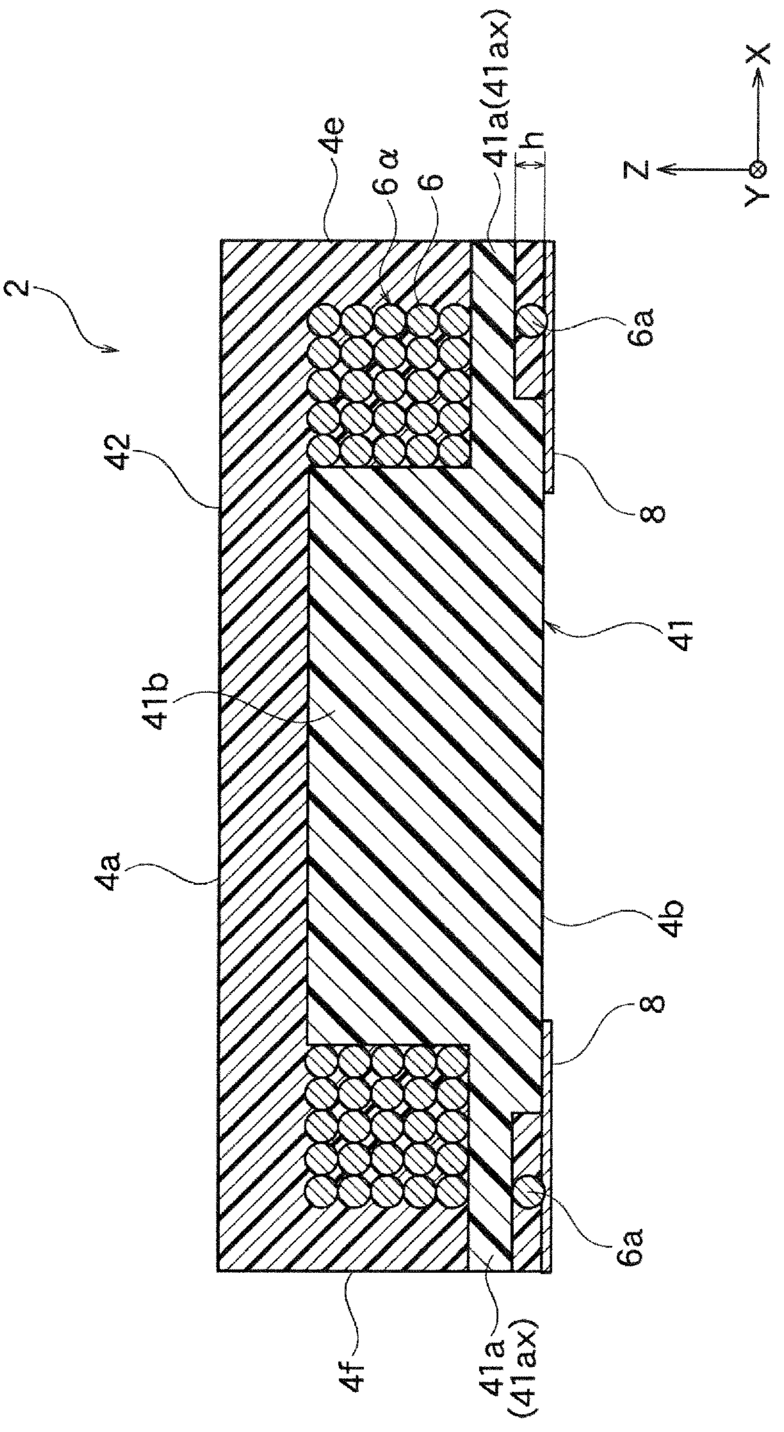
FIG. 3A is a cross-sectional view taken along line IIIA-IIIA shown in FIG. 1.

As shown in FIG. 1 and FIG. 3A, the element main body 4 in this embodiment includes a first core portion 41 and a second core portion 42. Both the first core portion 41 and the second core portion 42 can be constituted by a dust core containing a magnetic material and a resin.

The magnetic material contained in the core portions 41 and 42 can be constituted, for example, by a ferrite powder or a metal magnetic powder. Examples of the ferrite powder include Ni—Zn-based ferrite and Mn—Zn-based ferrite. In addition, the metal magnetic powder is not particularly limited, and examples thereof include an Fe—Ni alloy, an Fe—Si alloy, an Fe—Co alloy, an Fe—Si—Cr alloy, an Fe—Si—Al alloy, an Fe-containing amorphous alloy, an Fe-containing nano-crystalline alloy, and other soft magnetic alloys. Note that, subcomponents may be appropriately added to the ferrite powder or the metal magnetic powder.

In addition, for example, both of the first core portion 41 and the second core portion 42 may be constituted by the same kind of magnetic material, and relative permeability μ1 of the first core portion 41 and relative permeability μ2 of the second core portion 42 may be set to be the same as each other. Alternatively, the composition of the magnetic materials may be different between the first core portion 41 and the second core portion 42.

Further, with regard to the magnetic material (that is, the ferrite powder or the metal magnetic powder) constituting the first core portion 41 or the second core portion 42, a median diameter (D50) thereof can be set to 5 to 50 μm. Moreover, the magnetic material may be constituted by mixing a plurality of particle groups different in D50. For example, large diameter powder of which D50 is 8 to 15 μm, a median diameter powder of which D50 is 1 to 5 μm, and a small diameter powder of which D50 is 0.3 to 0.9 μm may be mixed.

In the case of mixing the plurality of particle groups as described above, a ratio of the large diameter powder, the median diameter powder, and the small diameter powder is not particularly limited. In addition, the large diameter powder, the median diameter powder, and the small diameter powder can be constituted by the same kind of material, or can be constituted by different materials. As described above, since the magnetic material contained in the first core portion 41 or the second core portion 42 is constituted by the plurality of particle groups, a packing density of the magnetic material contained in the element main body 4 can be increased. As a result, various characteristics of the inductor 2 such as permeability, eddy current loss, and DC bias characteristics are improved.

Here, the particle size of the magnetic material can be measured by observing the cross-section of the element main body 4 with a scanning electron microscope (SEM), a scanning transmission electron microscope (STEM), or the like, and performing image analysis of an obtained cross-section photograph with software. At this time, it is preferable that the particle size of the magnetic material is measured in terms of an equivalent circle diameter.

Moreover, in a case where the first core portion 41 or the second core portion 42 is constituted by the metal magnetic powder, particles constituting the powder are preferably insulated from each other. Examples of an insulating method include a method of forming an insulation coating on a particle surface. Examples of the insulation coating include a film formed from a resin or an inorganic material, and an oxidized film formed by oxidizing the particle surface through heat treatment. In the case of forming the insulation coating with a resin or an inorganic material, examples of the resin include a silicone resin, and an epoxy resin. Examples of the inorganic material include phosphates such as magnesium phosphate, calcium phosphate, zinc phosphate, and manganese phosphate, silicates such as sodium silicate (water glass), soda lime glass, borosilicate glass, lead glass, aluminosilicate glass, borate glass, and sulfate glass. By forming the insulation coating, insulation properties among particles can be enhanced, and a withstand voltage of the inductor 2 can be improved.

Further, the resin included in the first core portion 41 and the second core portion 42 is not particularly limited, and for example, thermosetting resins such as an epoxy resin, a phenol resin, a melamine resin, a urea resin, a furan resin, an alkyd resin, a polyester resin, and a diallyl phthalate resin, thermoplastic resins such as an acrylic resin, polyphenylene sulfide (PPS), polypropylene (PP), and a liquid crystal polymer (LCP), or the like can be used.

As shown in FIG. 1, the first core portion 41 includes flange portions 41*a*, a winding core portion 41*b*, and notched portions 41*c*. The flange portions 41*a* protrude toward each of the side surfaces 4*c* to 4*f* of the element main body 4, and four pieces of flange portions 41*a* are formed in correspondence with the side surfaces 4*c* to 4*f*. The coil portion 6α is mounted on upper surfaces of the flange portions 41*a*, and the flange portions 41*a* support the coil portion 6α. Here, two pieces of the flange portions 41*a* protruding along the X-axis direction are referred to as first flange portions 41*ax*, and two pieces of the flange portions 41*a* protruding along the Y-axis direction are referred to as second flange portions 41*ay*. The thickness of the first flange portions 41*ax* is smaller than the thickness of the second flange portions 41*ay*, and a space in which a part of a lead portion 6*a* is accommodated exists under the first flange portions 41*ax*.

The winding core portion 41*b* is located above the flange portions 41*a* in the Z-axis direction, and is formed integrally with the flange portions 41*a*. Further, the winding core portion 41*b* has a shape of approximately elliptical column protruding toward an upward side in the Z-axis, and is inserted to an inner side of the coil portion 6α. The shape of the winding core portion 41*b* is not limited to the shape shown in FIG. 1 and FIG. 3A, and may be set to a shape that matches a winding shape of the coil portion 6α. For example, the shape of the winding core portion 41*b* can be set to a circular column shape or a prism shape.

The notched portions 41*c* are located among the flange portions 41*a*, and four pieces of the notched portions 41*c* are formed at corners of an X-Y plane. That is, the notched portions 41*c* are formed in the vicinity of sites at which the side surfaces 4*c* to 4*f* of the element main body 4 intersect each other. The notched portions 41*c* are used as a passage through which the lead portion 6*a* drawn from the coil portion 6α passes. In addition, the notched portions 41*c* also function as a passage when a molding material constituting the second core portion 42 flows from a front surface side to a rear surface side of the first core portion 41 in a manufacturing process. In FIG. 1, the notched portion 41*c* is cut in an approximately square shape, but the shape of the notched portion 41*c* is not particularly limited as long as the lead portion 6*a* and/or the molding material may pass therethrough. For example, the notched portions 41*c* may be a through-hole that passes through front and rear surfaces of the flange portions 41*a*.

As shown in FIG. 3A, the second core portion 42 covers the first core portion 41. More specifically, the second core portion 42 covers the coil portion 6α and the winding core portion 41*b* above the flange portion 41*a*. Moreover, the second core portion 42 is filled in the spaces existing the notched portion 41*c* and under the first flange portions 41*ax*. Note that, as shown in FIG. 2, a lower surface of the second flange portions 41*ay* constitutes a part of the bottom surface 4*b* of the element main body 4, and the second core portion 42 is not filled under the second flange portions 41*ay*.

As shown in FIG. 1, a pair of the lead portions 6*a* is drawn from the coil portion 6α along the Y-axis above the first flange portions 41*ax*. Further, the pair of lead portions 6*a* is folded back in the vicinity of the side surface 4*c* of the element main body 4 and extends from the side surface 4*c* to the side surface 4*d* under the first flange portions 41*ax*.

Here, a height h from the bottom surface 4*b* of the element main body 4 to the first flange portions 41*ax* in the Z-axis direction is shorter than an outer diameter of each of the lead portions 6*a*. Accordingly, the majority of the lead portion 6*a* is accommodated at the inside of the element main body 4 (particularly, the second core portion 42), but a part of an outer periphery of the lead portion 6*a* is exposed to the bottom surface 4*b* of the element main body 4, under the first flange portions 41*ax*. Each of the lead portions 6*a* is constituted by the wire 6, but at a site exposed to the bottom surface 4*b*, the insulating layer existing on the outer periphery of the wire 6 is removed, and the conductor portion of the wire 6 is exposed. In this embodiment, as shown in FIG. 2, a site of the conductor portion of the wire 6 exposed to the bottom surface 4*b* is referred to, particularly, as a leadout electrode portion 61.

In this embodiment, as shown in FIG. 2, the pair of terminal electrodes 8 is formed to cover a pair of the leadout electrode portions 61, respectively, and the leadout electrode portions 61 are electrically connected to the terminal electrodes 8.

The terminal electrode 8 includes at least a resin electrode layer 81. In addition, the terminal electrode 8 may have a stacked structure including the resin electrode layer 81 and other electrode layers. In a case where the terminal electrode 8 is set to have the stacked structure, the resin electrode layer 81 is formed so as to be in direct contact with the leadout electrode portion 61. Then, the other electrode layers are stacked on an outside-surface of the resin electrode layer 81. That is, the other electrode layers are stacked on an opposite side of the leadout electrode portion 61. The other electrode layers may be a single layer or a plurality of layers, and a material thereof is not particularly limited. For example, the other electrode layers can be constituted by a metal such as Sn, Au, Ni, Pt, Ag, and Pd, or alloy containing at least one kind of the above metal elements. Further, the other electrode layers can be formed by plating or sputtering. Moreover, an entire average thickness of the terminal electrodes 8*a* and 8*b* is preferably set to 10 to 60 μm, and an average thickness of the resin electrode layer 81 is preferably set to 10 to 20 μm.

FIG. 4A to FIG. 4C are enlarged cross-section views of a joining boundary between the leadout electrode portion 61 and the resin electrode layer 81 of the terminal electrode 8. As shown in FIG. 4A, the resin electrode layer 81 contains a resin component 82 and a conductor powder 83. The resin component 82 in the resin electrode layer 81 is constituted by a thermosetting resin such as an epoxy resin and a phenol resin. The conductor powder 83 mainly contains Ag and may contain Cu, Ni, Sn, Au, Pd, or the like.

In addition, in this embodiment, the conductor powder 83 of the resin electrode layer 81 is constituted by two particle groups different in a particle size distribution, that is, first particles 83*a* and second particles 83*b*. The first particles 83*a* are a group of particles on the order of micrometers. In this embodiment, "particles on the order of micrometers" mean particles having an average particle size of 0.05 μm or more and several tens of μm or less. The average particle size of the first particles 83*a* is preferably 1 to 10 μm in a cross-section shown in FIG. 4A, and more preferably 3 to 5 μm.

In addition, a shape of the first particles 83*a* can be a shape close to a sphere, a long spherical shape, an irregular block shape, a needle shape, or a flat shape, and more preferably the needle shape or the flat shape. In this embodiment, particles having an aspect ratio of 2 to 30 in the cross-section as shown in FIG. 4A are referred to as the flat shaped particles, in which the aspect ratio is a ratio of a length in a longitudinal direction to a length in a short-length direction. Note that, the average particle size of the first particles 83*a* can be measured by observing the cross-section as shown in FIG. 4A to FIG. 4C with a SEM or a STEM, and performing image analysis of an obtained cross-sectional photograph. In this measurement, the average particle size of the first particles 83*a* is calculated in terms of a maximum length.

On the other hand, the second particles 83*b* are a group of particles on the order of nanometers, and have a smaller average particle size than the first particles 83*a*. The second particles 83*b* are aggregated and exist in the vicinity of an outer periphery of the first particles 83*a* and/or particle gaps of the first particles 83*a* as shown in FIG. 4B and FIG. 4C. When observing a cross-section enlarged as shown in FIG. 4C with the STEM, the second particles 83*b* are recognized as an aggregate of micro-particles that has a particle size of at least 100 nm or less. Note that, the second particles 83*b* are added as nano-particles having an approximately spherical shape and an average particle size (equivalent circle diameter) of 5 to 30 nm in a process of manufacturing paste that is a raw material of the resin electrode layer 81.

In addition, both the first particles 83*a* and the second particles 83*b* contain Ag as a main component. In a case where a metal element other than Ag is also contained in the conductor powder 83, an existence aspect of the metal element is not particularly limited. For example, the metal element other than Ag may exist as particles other than the first particles 83*a* and the second particles 83*b*, or may be solidly dissolved in the first particles 83*a*.

In addition, in the cross-section of the resin electrode layer 81 as shown in FIG. 4A, when an area of an observation field of view including the resin component 82 and the conductor powder 83 is set as 100%, an area occupied by the conductor powder 83 is preferably 60% or more. In addition, in the cross-section of the resin electrode layer 81, when an area occupied by the first particles 83*a* is set as A1 and an area occupied by the second particles 83*b* is set as A2, a ratio of A1 to A2 (A1/A2) is preferably 1.5 to 6.0.

Here, the area occupied by each of the elements can be measured by observing the cross-section of the resin electrode layer 81 as shown in FIG. 4A with the SEM or the STEM and performing image analysis of an obtained cross-sectional image. In the case of using the SEM, it is preferable to perform the observation with a reflected electron image, and in the case of using the STEM, it is preferable to perform the observation with an HAADF image. In the above observation images, a portion having a dark contrast is the resin component 82 and a portion having a bright contrast is the conductor powder 83. Further, the second particles 83*b* are observed as an aggregate of micro-particles as described above, and the area A2 occupied by the second particles 83*b* is set as an area of the aggregate. A size of the observation field per one field of view is preferably 0.04 to 0.36 $\mu m^2$ in the above observation, and the area occupied by each of elements is preferably calculated as an average value obtained after observation on at least 10 fields or greater.

As shown in FIG. 4A, a region R1 where the resin component 82 is in contact with the outermost surface of the leadout electrode portion 61, a region R2 where the first particles 83*a* of the conductor powder 83 are in contact with the outermost surface, and a region R3 where the second particles 83*b* of the conductor powder 83 are in contact with the outermost surface exist at the interface between the leadout electrode portion 61 and the resin electrode layer 81. In the cross-section as shown in FIG. 4A, when a length of a boundary line between the leadout electrode portion 61 and the resin electrode layer 81 is set as 100%, a ratio of the region R3 where the second particles 83*b* are in contact the outermost surface is preferably approximately 20% to 100%.

In this embodiment, a diffusion layer 68 is formed at the interface between the leadout electrode portion 61 and the resin electrode layer 81. This diffusion layer 68 exists in the region R3 where the second particles 83*b* are in contact with the outermost surface of the leadout electrode portion 61 as shown in FIG. 4C. Accordingly, the diffusion layer 68 intermittently exists along the interface between the leadout electrode portion 61 and the resin electrode layer 81. Further, an existence ratio of the diffusion layer 68 in a plane direction at the interface between the leadout electrode portion 61 and the resin electrode layer 81 corresponds to the ratio of the region R3 where the second particles 83*b* are in contact with the outermost surface, and the further the content ratio of the second particles 83*b* contained in the resin electrode layer 81 increases, the higher the existence ratio of the diffusion layer 68 in the plane direction becomes.

This diffusion layer 68 contains at least copper oxide and Ag, and may contain voids or the resin component 82. In addition, the thickness T1 of the diffusion layer 68 is at least 30 nm or greater, preferably 30 to 500 nm, and more preferably 50 to 250 nm.

Note that, as shown in FIG. 4D, a region where an oxidized film 61*a* containing copper oxide as a main component is formed may exist on a surface side of the leadout electrode portion 61. This oxidized film 61*a* may be formed when exposing the leadout electrode portion 61 to the bottom surface 4*b* in a process of manufacturing the inductor 2. Alternatively, the oxidized film 61*a* may be formed by performing a predetermined heating treatment after applying resin electrode paste to the bottom surface 4*b*. Here, the oxidized film 61*a* may be formed over the entire region of the surface of the leadout electrode portion 61, or may be formed only at a part of the surface of the leadout electrode portion 61.

In this embodiment, even when the oxidized film 61*a* is formed by performing exposure of the leadout electrode portion 61 or formation of the resin electrode layer 81 under a predetermined condition to be described later, the diffusion layer 68 may be formed at the interface between the leadout electrode portion 61 and the resin electrode layer 81. In this case, the diffusion layer 68 may be located between the oxidized film 61*a* of the leadout electrode portion 61 and the resin electrode layer 81. In addition, the thickness T2 of the oxidized film 61*a* can be approximately 5 to 100 nm, and is preferably within a range of 5 to 30 nm.

Note that, FIG. 5A and FIG. 5B are cross-sectional views in the case of forming a resin electrode layer 811 with only particles 833 having the particle size of micrometer order as in the related art. In the case of the related art shown in FIG. 5A and FIG. 5B, electric contact between the leadout electrode portion 61 and the terminal electrode 8 is secured by physical contact of the particles 833 with the leadout electrode portion 61 at an interface between the leadout electrode portion 61 and the resin electrode layer 811. That is, the diffusion layer 68 is not formed in the case of forming a conductor powder contained in the resin electrode layer 811 with only the particles 833 on the order of micrometers.

In this embodiment, since the diffusion layer 68 is formed at the interface between the leadout electrode portion 61 and the terminal electrode 8, adhesion strength of the resin electrode layer 81 to the leadout electrode portion 61 can be improved. As a result, joining reliability of the terminal electrode 8 with respect to the element main body 4 can be improved, and the resistance of the terminal electrode 8 can be reduced.

The diffusion layer 68 contains copper oxide and Ag as described above, and existence or non-existence of the diffusion layer 68 can be recognized through line analysis using STEM-EPMA (electron probe micro analyzer), mapping analysis, or the like.

For example, in the line analysis by STEM-EPMA, a measurement line is drawn in a direction approximately orthogonal to the interface between the leadout electrode portion 61 and the resin electrode layer 81, and quantitative analysis is performed on the measurement line with constant intervals. Here, in the above analysis, a sample for STEM observation can be prepared by a micro sampling method using a focused ion beam (FIB). In addition, in the line analysis, a size of each measurement point (spot size) is preferably set to have a diameter of 1.5 nm or less, and an interval of the measurement point is preferably set to 1.0 nm or less.

FIG. 6A is a schematic view illustrating a result obtained by the line analysis with the EPMA along a measurement line VIA. As shown in FIG. 6A, a concentration gradient of Ag occurs in a range of the thickness T1 from the outermost surface of the leadout electrode portion 61 toward the resin electrode layer 81. Here, the outermost surface of the leadout electrode portion 61 can be specified from an observation image of the STEM, but can also be specified by the content rate of Cu. Specifically, a position where the content rate of Cu starts to decrease is set as the outermost surface of the leadout electrode portion 61. Further, in this embodiment, the region where the concentration gradient of Ag occurs from the outermost surface of the leadout electrode portion 61 toward the resin electrode layer 81 is specified as the diffusion layer 68. More specifically, a region where the content rate of Ag tends to increase while fluctuating from the outermost surface of the leadout electrode portion 61 toward the resin electrode layer 81 is set as the diffusion layer 68.

Further, when the outermost surface side of the leadout electrode portion 61 is set as a starting point of the diffusion layer 68 on the measurement line VIA, an end point of the diffusion layer 68 is set to a position where the content rate of Ag is stable.

Moreover, a line analysis result as shown in FIG. 6B is obtained in a case where the oxidized film 61*a* exists on the surface side of the leadout electrode portion 61. In a graph in FIG. 6B, a region where the content rate of Cu decreases and oxygen is detected exists on the surface side of the leadout electrode portion 61. In this embodiment, a region where the content rate of oxygen is 3 wt % or greater on the surface side of the leadout electrode portion 61 is determined as the oxidized film 61*a*. In addition, in a case where the oxidized film 61*a* exists, the "outermost surface of the leadout electrode portion 61" is set as a position where the content rate of Cu decreases, and the content rate of oxygen starts to decrease.

Note that, in the line analysis with the EPMA, an element existing in a depth direction of the measurement point, or an element existing in the vicinity of the outer periphery of the measurement point has an influence on a component analysis result. Therefore, even in a case where the diffusion layer 68 does not exist as in FIG. 5B, a region where the concentration gradient of Ag seems to slightly occur may exist at the interface between the leadout electrode portion 61 and the resin electrode layer 811. Actually, FIG. 7 is a line analysis result in a case where the diffusion layer 68 does not exist. In this embodiment, in a case where the thickness of a region B where the concentration gradient of Ag seems to exist as shown in FIG. 7 is less than 30 nm, it is determined that the diffusion layer 68 does not exist.

In addition, in a case where it is difficult to specify the diffusion layer 68 with only the concentration gradient of Ag, the diffusion layer 68 is specified also in consideration of a concentration gradient of Cu. The concentration gradient of Cu also occurs in a range having the thickness T1 from the outer surface of the leadout electrode portion 61 toward the resin electrode layer 81 as shown in FIG. 6A. That is, the content rate of Cu tends to decrease while fluctuating from the outermost surface of the leadout electrode portion 61 toward the resin electrode layer 81. The diffusion layer 68 is set as a region where the concentration gradient of Ag and the concentration gradient of Cu occur in combination from the outermost surface of the leadout electrode portion 61 toward the resin electrode layer 81. In this method, even in the case of specifying the diffusion layer 68, the thickness T1 is at least 30 nm or greater, and it is determined that the diffusion layer 68 does not exist in a case where the thickness T1 is less than 30 nm.

Moreover, the diffusion layer 68 may be specified based on the following definition in addition to the above method. That is, the diffusion layer 68 is a region in which both the content rate of Ag and the content rate of Cu are 5 wt % or greater on the resin electrode layer 81 side in comparison to the outermost surface of the leadout electrode portion 61. Alternatively, the diffusion layer 68 is a region in which the content rate of Ag fluctuates within a range of 5 to 100 wt %, and the content rate of Cu fluctuates within a range of 5 to 100 wt %.

On the other hand, in the case of measuring the diffusion layer 68 with the mapping analysis using the STEM-EPMA, mapping images as shown in FIG. 8A to FIG. 8C are obtained. FIG. 8A is a mapping image of Ag, FIG. 8B is a mapping image of Cu, and FIG. 8C is a mapping image of O. In addition, in FIG. 8A to FIG. 8C, the center of the drawings is the diffusion layer 68, the right side in the drawings is the leadout electrode portion 61, and the left side in the drawing is the resin electrode layer 81.

When comparing the mapping images of the respective elements (Ag, Cu, and O), it can be seen that a region where Cu and O overlap each other exists in the diffusion layer 68. In addition, it can be seen that Cu and O exist at a part where the amount of Ag detected is less, and the region where Cu and O overlap each other exists at a grain boundary of Ag particles. That is, a Cu component contained in the diffusion layer 68 does not exist as pure copper or an Ag—Cu alloy, but exists as copper oxide. Further, the copper oxide in the diffusion layer 68 exists at the grain boundary of the Ag particles.

As described above, in the case of performing the mapping analysis on the interface between the leadout electrode portion 61 and the resin electrode layer 81, the diffusion layer 68 can be recognized as a site where the Ag particles and the copper oxide are mixed.

Next, a method of manufacturing the inductor 2 according to this embodiment is described.

First, the first core portion 41 is prepared by a press method such as heating and pressing molding method, or an injection molding method. In preparation of the first core portion 41, a raw material powder of a magnetic material, a binder, a solvent, and the like are kneaded to obtain a granule and the granule is used as a molding raw material. In a case where the magnetic material is constituted by a plurality of particle groups, magnetic powders different in a particle size distribution are prepared, and may be mixed in a predetermined ratio.

Next, the coil portion 6α is mounted on the obtained first core portion 41. The coil portion 6α is a coreless coil obtained by winding the wire 6 in a predetermined shape in advance, and the coreless coil is inserted into the winding core portion **41*b* of the first core portion 41. Alternatively, the coil portion 6α can be formed by directly winding the wire 6 around the winding core portion 41*b* of the first core portion 41. After combining the first core portion 41 and the coil portion 6α, the pair of lead portions 6*a* is drawn from the coil portion 6α, and is disposed under the first flange portions 41*ax*, as shown in FIG. 1**.

Next, the second core portion 42 is prepared by the insert injection molding. In preparation of the second core portion 42, first, the first core portion 41 equipped with coil portion 6α is putted in a mold. It is preferable to spread a release film on an inner surface of the mold in advance. A flexible sheet-shaped member such as a PET film can be used as the release film. Since the release film is used, the lead portion **6*a* existing under the first flange portions 41*ax* comes into close contact with the release film, when putting the first core portion 41 in the mold. Therefore, a part of the outer periphery of the lead portion 6*a* is covered with the release film, and a part of the outer periphery of the lead portion 6*a* is exposed from the bottom surface 4*b* of the element main body 4 after forming the second core portion 42**.

As a raw material constituting the second core portion 42, a material having fluidity at the time of molding is used. Specifically, a composite material obtained by kneading a raw material powder of a magnetic material, and a binder such as the thermoplastic resin or the thermosetting resin may be used. A solvent, a dispersant, or the like may be appropriately added to the composite material. The above composite material is introduced into the mold in a slurry state, in the insert injection molding. At this time, the introduced slurry passes through the notched portion **41*c* of the first core portion 41 and is also filled under the first flange portions 41*ax*. Then, during the injection molding, heat is appropriately applied according to the type of the binder of the composite material. In this manner, the element main body 4 is obtained, in which the first core portion 41, the second core portion 42, and the coil portion 6**α are integrated.

Next, a planned electrode portion is formed by irradiating the laser for a part of the bottom surface **4*b* of the element main body 4, that is, a part where the pair of terminal electrodes 8 in FIG. 2 would be formed. Due to the laser irradiation, the insulating layer of the lead portion 6*a* exposed to the bottom surface 4*b* is removed. Thereby, the leadout electrode portion 61 is formed. Moreover, due to the laser irradiation, the resin contained in the core portions 41 and 42 is removed from the outermost surface of the bottom surface 4*b*. That is, the magnetic material contained in the core portions 41 and 42 is exposed and the leadout electrode portion 61 is exposed in the planned electrode portion. According to this, the terminal electrodes 8 are likely to come into close contact with the bottom surface 4*b* of the element main body 4**.

The laser used in the above process is preferably a UV laser of which a wavelength is a short wavelength of 400 nm or less. In laser processing, a green laser (wavelength: 532 nm) is typically used, but the principle of removing a target (the insulating layer of the lead portion **6*a*, the resin of the core portion, or the like) is different between the green laser and the UV laser. In the case of the green laser, a surface temperature of the target rapidly rises due to the laser irradiation, and the target is melted or evaporates (thermally decomposed) to be removed. Accordingly, when using the green laser, an oxidized film having a thickness greater than 100 nm is likely to be formed on the surface of the exposed leadout electrode portion 61, and generation of the diffusion layer 68 is suppressed. On the other hand, in the case of the UV laser, molecular bonds of an organic compound constituting the target are decomposed by the UV laser. Thereby, the target is removed. Even in the case of using the UV laser, slight temperature rise also occurs and thermal decomposition also occurs. However, formation of the oxidized film is much more difficult in the case of using the UV laser than in the case of using the green laser. Therefore, the diffusion layer 68** is likely to be formed by using the UV laser.

Note that, mechanical polishing, a blast treatment, a chemical corrosion treatment, and the like are also considered as a method of forming the planned electrode portion, but a film (an oxidized film or a corrosion layer) having a thickness greater than 100 nm is likely to be formed even in these methods. Therefore, the planned electrode portion is preferably formed through irradiation of UV laser as described above.

Next, resin electrode paste is applied to the planned electrode portion by a method such as a printing method. A binder becoming the resin component 82 and a metal raw material powder becoming the conductor powder 83 are contained in the resin electrode paste used in this case. More specifically, the metal raw material powder is constituted by micro-particles having a particle size of the micrometer order, and nano-particles having a particle size of the nanometer order. The micro-particles are particles becoming the first particles **83*a* after hardened the paste, and an average particle size thereof is preferably 1 to 10 μm, and more preferably 3 to 5 μm. On the other hand, the nano-particles are particles becoming the second particles 83*b*** after hardened the paste, and an average particle size thereof is preferably 5 to 30 nm, and more preferably 5 to 15 nm.

Note that, in printing of the resin electrode paste, conditions such as the amount of application are controlled so that the average thickness of the resin electrode layer 81 after a heating treatment becomes 10 to 20 μm. Since the thickness of the resin electrode layer 81 is adjusted to the above range, the diffusion layer 68 is likely to be formed.

After applying the resin electrode paste to the planned electrode portion, the element main body 4 is subjected to a heating treatment under predetermined conditions to harden the binder (the resin component 82) in the paste. As the conditions in the heating treatment, a treatment temperature (holding temperature) is preferably 170° C. to 230° C., and a holding time is preferably 60 to 90 minutes. When performing the heating treatment under the above conditions, the resin electrode layer 81 is formed at the planned electrode portion of the element main body 4.

Here, a method of forming the diffusion layer 68 is described. In this embodiment, the diffusion layer 68 is formed by 1) forming the planned electrode portion through irradiation with the UV laser, 2) applying the resin electrode paste containing nano-particles to the planned electrode portion in a predetermined thickness (thickness with which the thickness of the resin electrode layer 81 after a heating treatment becomes 10 to 20 μm), and 3) performing the heating treatment under predetermined conditions. Further, the thickness T1 of the diffusion layer 68 can be controlled by the conditions at the time of the heating treatment. For example, at the time of the heating treatment, as heat energy applied increases (the holding temperature is raised or the holding time is lengthened), the thickness T1 of the diffusion layer 68 tends to increase. Note that, the formation conditions of the diffusion layer 68 are illustrative only, and the diffusion layer 68 can be formed under conditions other than the above conditions.

After forming the resin electrode layer 81, a plating film or a sputtering film may be appropriately formed on the outer surface of the resin electrode layer 81. For example, by formed a plating film of Ni, Cu, Sn, or the like on the outer surface of the resin electrode layer 81, solder wettability is improved.

The inductor 2 having the pair of terminal electrodes 8 formed in the element main body 4 is obtained by the above manufacturing method.

Summary of Embodiment

In the inductor 2 of this embodiment, the terminal electrode 8 includes the resin electrode layer 81. This resin electrode layer 81 is formed by subjecting the resin component 82 to a hardening treatment, and a baking treatment at a high temperature is not necessary during a manufacturing process. Further, in the inductor 2 of this embodiment, the diffusion layer 68 containing Ag and copper oxide is formed at the interface between the leadout electrode portion 61 and the resin electrode layer 81. Since the diffusion layer 68 is formed, adhesion strength of the resin electrode layer 81 to the leadout electrode portion 61 can be improved. As a result, the joining reliability of the terminal electrode 8 is improved, and the resistance of the terminal electrode 8 can be reduced.

In addition, in this embodiment, the conductor powder 83 of the resin electrode layer 81 is constituted by the second particles 83*b* obtained from nano-particles as a raw material and the first particles 83*a* having a flat shape and a particle size of the micrometer order. According to this configuration, the adhesion strength of the resin electrode layer 81 to the leadout electrode portion 61 is further improved, and the joining reliability of the terminal electrode 8 is further improved. Further, due to the above configuration, the second particles 83*b* aggregate in particle gaps of the first particles 83*a*, and play a role of electrically connecting the gaps of the first particles 83*a*. As a result, the resistance of the terminal electrode 8 can be further reduced.

Further, in this embodiment, the oxidized film 61*a* may be formed on at least a part of the surface of the leadout electrode portion 61. Even when the oxidized film 61*a* exists, the diffusion layer 68 may be formed by forming the resin electrode layer 81 under the above conditions. Accordingly, even in a case where the oxidized film 61*a* exists, the joining reliability of the terminal electrode 8 can be improved, and the resistance of the terminal electrode 8 can be reduced.

Figure 3B:
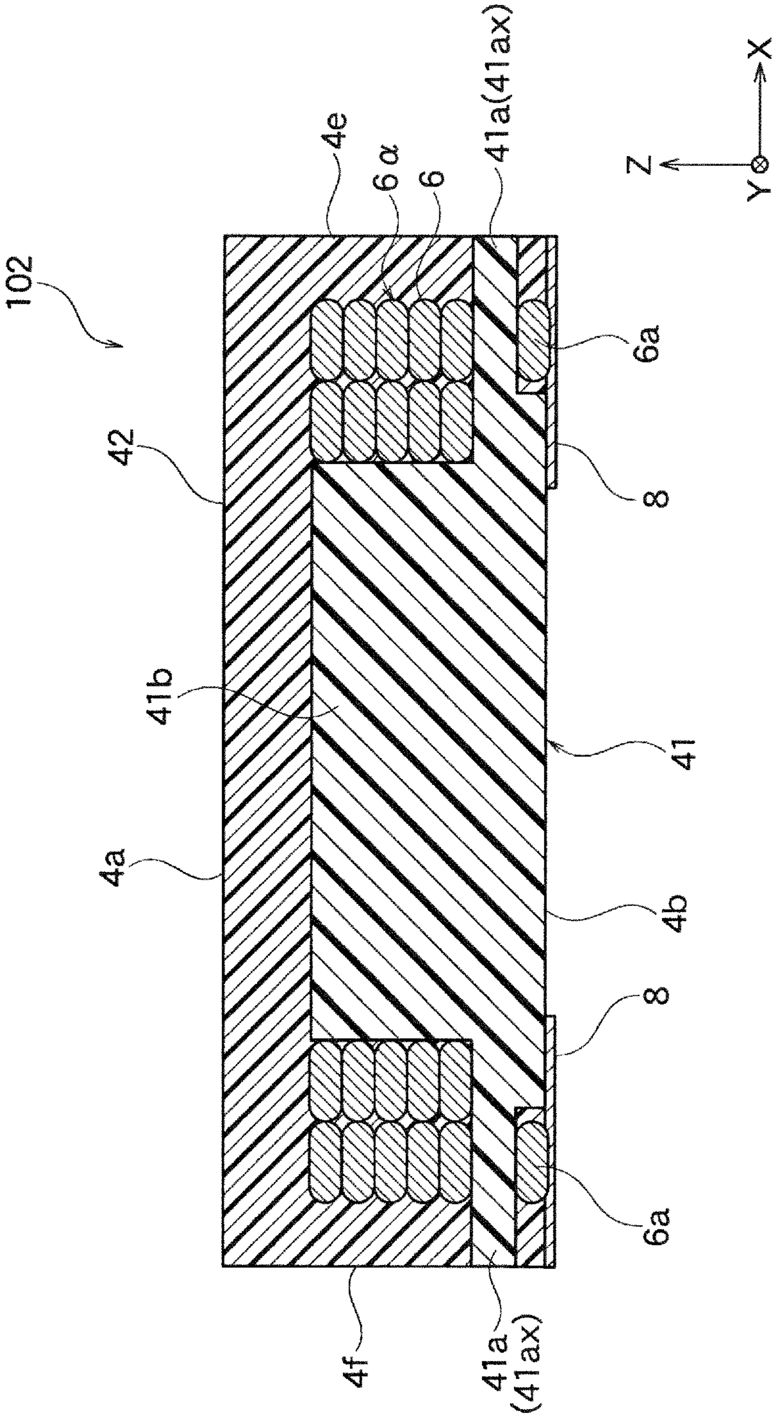
FIG. 3B is a cross-sectional view illustrating a modification example of the electronic component shown in FIG. 1 and FIG. 3A.

Hereinbefore, the embodiment of the present invention has been described, but the present invention is not limited to the above embodiment, and various modifications can be made within the scope of the present invention. For example, in FIG. 1 to FIG. 3A, the coil portion 6α is constituted by a round wire 6. However, the kind of the wire 6 is not limited thereto, and may be a flat wire in which a cross-sectional shape of a conductor portion is an approximately rectangular shape as shown in FIG. 3B. Alternatively, the wire may be a square wire or a litz wire made by twisting multiple thin wires. Furthermore, the coil portion 6α may be constituted by laminating conductive plate materials.

In addition, in the above embodiment, the terminal electrode 8 is formed on the bottom surface 4*b* of the element main body 4. However, the position of the terminal electrode 8 is not limited thereto, and may be formed on the upper surface 4*a* or the side surfaces 4*c* to 4*f*, or may be formed over a plurality of surfaces.

Further, the conductor powder 83 of the resin electrode layer 81 may be constituted by only the second particles 83*b* obtained from nano-particles as a raw material. Alternatively, particles having a specific surface area greater than that of the micro-particles (first particles 83*a*) may be used instead of the second particles 83*b*.

In addition, the first core portion 41 constituting the element main body 4 can also be a sintered body of a ferrite powder or a metal magnetic powder. Further, the element main body 4 itself may be a dust core or a sintered body core of an FT type, an ET type, an EI type, a UU type, an EE type, an EER type, a UI type, a drum type, a pot type, or a cup type, and the inductor may be constituted by winding the coil around the core. In this case, it is not necessary to embed the lead portion inside the element main body, and the lead portion may be drawn along an outer periphery of the core to be connected to the outer surface of the terminal electrode 8.

The electronic component according to the present invention is not limited to the inductor, and may be an electronic component such as a capacitor, a transformer, a choke coil, and a common mode filter. For example, in a case where the electronic component is a stacked ceramic capacitor, a portion of inner electrode layers exposed to an end surface of a stacked body becomes the leadout electrode portion 61. Further, in the stacked ceramic capacitor, the terminal electrode 8 is formed on the end surface of the stacked body in conformity to the exposed portion of the inner electrode layers.

EXAMPLES

Hereinafter, the present invention is further described with reference to detailed examples, but the present invention is not limited to the examples.

Example

In an example, an inductor sample shown in FIG. 1 was prepared. Specifically, an element main body having a planned electrode portion was prepared by the method described in the embodiment, and a resin electrode layer having a thickness of 10 to 20 μm was formed at the planned electrode portion. At the time of forming the resin electrode layer, a heating treatment was performed under the conditions described in the embodiment by using resin electrode paste containing flat shaped first particles (Ag micro-particles) and second particles (Ag nano-particles). Then, with respect to the obtained inductor sample, an interface between a leadout electrode portion and a terminal electrode was analyzed (line-analyzed) with the STEM-EPMA. As a result, in the example, as in the graph of FIG. 6A, it could be found that a diffusion layer was formed at the interface between the leadout electrode portion and the resin electrode layer (particularly, at a portion with which an aggregate of the second particles come into contact with the leadout electrode portion). The thickness T1 thereof was 120 nm.

Comparative Example

In a comparative example, an inductor sample was prepared by using resin electrode paste containing only Ag micro-particles as a conductor powder. Further, with respect to the comparative example, the interface between the leadout electrode portion and the terminal electrode was line-analyzed with the STEM-EPMA. As a result, in the comparative example, it could be found that the same analysis result as in FIG. 7 was obtained, and the diffusion layer was not formed.

Evaluation

A DC resistance of the inductor sample obtained above and a contact resistance of the terminal electrode were measured. The DC resistance and the contact resistance were measured at ten sites in the example and the comparative example, and an average value thereof, and a CV value (fluctuation coefficient) were calculated. As a result, it could be found that the contact resistance was further reduced by 4% in the example having the diffusion layer than in the comparative example. Further, from comparison of the CV value of the DC resistance between the example and the comparative example, the CV value in the example was approximately ⅓ of the comparative example. Therefore, it could be seen that the resistance of the terminal electrode can be reduced and a deviation of the resistance can be reduced by forming the diffusion layer at the interface between the leadout electrode portion and the terminal electrode.

In addition, a high-temperature load test (acceleration test) was performed to check the joining reliability of the terminal electrode. In the high-temperature load test, the inductor sample was exposed to a high-temperature environment of 100° C. or higher for a long time while applying a voltage to the inductor sample, and an increase rate of the DC resistance after the exposure was measured. As a result, the increase rate of the DC resistance in the example after the test was suppressed to ½ or less of the comparative example. Therefore, it could be found that the joining reliability of the terminal electrode is improved by forming the diffusion layer.

EXPLANATIONS OF LETTERS OR NUMERALS

2 . . . Inductor
4 . . . Element main body
4*a* . . . Upper surface
4*b* . . . Bottom surface
4*c* to 4*f* . . . Side surface
41 . . . First core portion
41*a* . . . Flange portion
41*b* . . . Winding core portion
41*c* . . . Notched portion
42 . . . Second core portion
6α . . . Coil portion
6 . . . Wire
6*a* . . . Lead portion
61 . . . Leadout electrode portion
61*a* . . . Oxidized film
8 . . . Terminal electrode
81 . . . Resin electrode layer
82 . . . Resin component
83 . . . Conductor powder
83*a* . . . First particle
83*b* . . . Second particle
68 . . . Diffusion layer

The invention claimed is:

1. An electronic component comprising:
a leadout electrode portion provided on an outer surface of an element main body; and
a resin electrode layer formed at a part of the outer surface of the element main body and connected to the leadout electrode portion,
wherein the leadout electrode portion contains copper as a main component,
the resin electrode layer includes a conductor powder containing silver, and a resin,
the conductor powder contains first particles having an average particle size of 1 μm to 10 μm and second particles having an average particle size of 5 nm to 30 nm,
a diffusion layer containing copper oxide and silver is formed at an interface with the leadout electrode portion in the resin electrode layer,
a first region (R1) where a resin component is in contact with an outermost surface of the leadout electrode portion, a second region (R2) where the first particles are in contact with the outermost surface, and a third region (R3) where the second particles are in contact with the outermost surface exist at the interface, and
the diffusion layer exists in the third region (R3) and is intermittently formed along the interface.

2. The electronic component according to claim 1,
wherein the thickness of the diffusion layer is at least 30 nm or greater.

3. The electronic component according to claim 2,
wherein a concentration gradient of silver occurs in the diffusion layer from an outermost surface of the leadout electrode portion toward the resin electrode layer.

4. The electronic component according to claim 1,
wherein the first particles have a flat shape, and
the second particles aggregate among the first particles.

5. The electronic component according claim 1,
wherein an oxidized film mainly containing copper oxide is formed on a surface side of the leadout electrode portion, and
the diffusion layer is located between the oxidized film and the resin electrode layer.

* * * * *